United States Patent [19]
Tong et al.

[11] Patent Number: 5,808,683
[45] Date of Patent: Sep. 15, 1998

[54] SUBBAND IMAGE CODING AND DECODING

[75] Inventors: Tak Yen Tong, Tokyo; Masami Ogata, Kanagawa; Teruhiko Suzuki, Chiba, all of Japan

[73] Assignee: Sony Corporation, Tokyo, Japan

[21] Appl. No.: 736,085

[22] Filed: Oct. 24, 1996

[30] Foreign Application Priority Data

Oct. 26, 1995  [JP]  Japan .................................. 7-300500

[51] Int. Cl.⁶ ...................................................... H04N 7/30
[52] U.S. Cl. ............................................ 348/398; 348/403
[58] Field of Search .................................... 348/398, 397, 348/408, 404, 403, 399, 390, 384; 382/240, 233, 232; H04N 7/133

[56] References Cited

U.S. PATENT DOCUMENTS

| | | | |
|---|---|---|---|
| 4,908,862 | 3/1990 | Kaneko et al. | 349/409 |
| 5,253,058 | 10/1993 | Gharavi | 348/409 |
| 5,398,067 | 3/1995 | Sakamoto | 348/403 |
| 5,420,636 | 5/1995 | Kojima | 348/408 |
| 5,495,292 | 2/1996 | Zhang et al. | 348/407 |
| 5,537,493 | 7/1996 | Wilkinson | 382/240 |
| 5,563,960 | 10/1996 | Shapiro | 348/398 |
| 5,657,085 | 8/1997 | Katto | 348/398 |
| 5,657,399 | 8/1997 | Iwabuchi et al. | 382/248 |

OTHER PUBLICATIONS

Moccagatta et al., "VQ and Cross–Band Prediction for Color Image Coding," Picture Coding Symposium, PCS 94, Sacramento, California, USA, Sep. 1994.

*Primary Examiner*—Bryan Tung
*Attorney, Agent, or Firm*—Frommer Lawrence & Haug LLP; William S. Frommer

[57] ABSTRACT

In encoding an input picture signal, the input signal is split by subband splitting into plural frequency bands for generating signals of plural frequency bands, and the signals of the respective frequency bands are quantized for generating quantized signals of the respective frequency bands. From these quantized signals of the respective frequency band, the coefficients existing at the same spatial positions of the respective layers resulting from spectrum splitting are extracted for generating a coefficient tree. This coefficient tree is S-scanned in a direction proceeding from the low frequency band towards the high frequency band for generating a scan sequence which is run-length encoded for generating encoded data. In decoding the encoded data, obtained as described above, is decoded by run-length decoding for generating a scan sequence from which a coefficient tree is re-constructed. The coefficients of the re-constructed coefficient tree located at the same spatial positions in the respective layers and the coefficients located at the same spatial positions are dequantized for generating signals of the plural frequency bands. These signals are decoded by subband decoding for reproducing the original input picture signal.

47 Claims, 11 Drawing Sheets

FIG.7

SUBBAND IMAGE CODING AND DECODING

BACKGROUND OF THE INVENTION

1. Field of the Invention

This invention relates to a picture signal encoding method and apparatus and a picture signal decoding method and apparatus. More particularly, it relates to a method and apparatus for compaction for transmission or recording for various sorts of application and usage such as recording a sequence of digitized moving pictures on, for example, a digital recording medium, or transmitting it by television broadcasting or over a communication network. For example, sub-band coding [1, 7] and wavelet transform [2] are used in general for picture compression because they realize good energy compaction and good performance in area with textures. The technique which is simple, efficient and flexible for coding transform coefficients of sub-band coding or wavelet transform is herein explained. The technique of reducing the amount of bits to represent the coefficients by locating and removing unimportant coefficients with only slight reduction in the S/N ratio is also explained. Also, the technique reducing the amount of bits representing the chroma components by identifying the insignificant chroma components based on their corresponding luminance components is explained.

2. Description of the Related Art

In recent years, increasing efforts have been directed toward providing digital speech, image and video sequence for a more efficient transmission or recording thereof. Some possible applications are digital video, video phone, interactive TV or interactive games. However, in view of the large amount of data involved in picture signals, data compression is necessary to reduce the amount of data transfer. One of such efforts is developed jointly by the International Organization of Standardization (ISO) and the International Electrotechnical Commission (IEC) which is widely known as Moving Pictures Experts Group (MPEG).

Energy of most images can be concentrated in a small fraction of the samples by means of waveform transform while preserving its total energy. The unequal distribution of the energy of the transformed image is exploited by compression algorithms. The basic idea of subband/wavelet coding is to split up the signal bandwidth into several subbands as shown in FIG. 1, with large fraction of the total energy of the image concentrated at one band (the lowest frequency components band). A typical three-layer subband/wavelet decomposition of an image is shown in FIG. 2. The terms layer 0 (lowest layer), and layer 2 (highest layer) in FIG. 1 correspond to the group of layer 1 and layer 2 (highest layer) in FIG. 1 correspond to the groups of frequency and each group of coefficients are gathered according to their spatial position as shown in FIG. 2. The coefficients of the decomposed subband/wavelet image are first quantized and the quantized coefficients are compressed using lossless compression schemes such as Huffman code [3], variable length code (VLC) or arithmetic coding [4]. However, the issue on gathering the quantized coefficients for efficient lossless compression is very important. An efficient data structure technique to gather quantized coefficients for lossless coding is used to represent coefficients in different layers using a tree structure [5,6] and it is referred to here as coefficient tree.

Due to the hierarchical structure of subband coding, with the exception of the highest frequency subbands, every coefficients at a given layer can be related to a set of coefficients at the next lower layer of similar orientation or spatial locations. FIG. 2 shows the data structure of the coefficient tree which consists of coefficients from different layers. A clever method by J. Shapiro [5] considers the strong correlation between coefficient trees with all insignificant coefficients at the same spatial locations in different layers, and Shapiro refers it to as zero-tree. Just one symbol is required to indicate/code the coefficient tree with all insignificant coefficients (i.e. zero-tree). Hence, less bits are needed to code a zero-tree. However there is little or no correlation between significant coefficients at different layers in the coefficient tree and zero-tree technique becomes not so efficient when coding significant coefficients. Every symbol, including zero, has to be coded. Also, the zero-tree technique can only code one tree at a time even if all its neighboring trees are highly correlated.

Reference Publications

[1] J. Wood, Subband Image Coding, Kluwer Academic Publishers, Boston Mass., 1991)

[2] J. Daubechies, Orthonormal Bases of Compactly Supported Wavelets, Commun. Pure Appl. Math., Vol. 41, pp.961 to 996, 1988

[3] D. Huffman, Method for the Construction of Minimum Redundancy Codes, Processing of the Institute of Radio Engineers, pp.1098 to 1101, September 1952

[4] G. Langdon and J. Rissanen, Simple General Binary Source Code, IEEE Transactions on Information Theory, Vol.IT-28(5), pp.800 to 803, September 1982

[5] J. Shapiro, Embedded Image Coding Using Zero-Trees of Wavelet Coefficients, IEEE Transactions on Signal Processing, Vol.41, No.12, pp.3445 to 4361, December 1993

[6] A. Lewis and G. Knowles, Image Compression Using 2-D Wavelet Transform, IEEE Transactions on Image Processing, Vol.1, No.2, pp.244 to 250, April 1992

[7] Iole Moccagatta and Murat Kunt, VQ and Cross-Band Prediction for Color Image Coding, Picture Coding Symposium PSC94, Sacramento, Calif., USA, pp.383 to 386, September 1994.

SUMMARY OF THE INVENTION

It is an object of the present invention to provide a picture signal encoding method and apparatus whereby coefficients of wavelet transform can be coded more efficiently than is possible with the conventional method and apparatus.

It is another object of the present invention to provide a picture signal decoding method and apparatus whereby data encoded by the above encoding method and apparatus can be decoded to reproduce original picture signals.

Specifically, the present invention provides a scan sequence for transform coefficients whereby the transform coefficients can be encoded efficiently by run-length encoding. The present invention also provides a method for detecting an isolated coefficient in the lowermost frequency band (layer 0) for further reducing the number of bits required for encoding the transform coefficients without deteriorating the encoded picture quality. The present invention also provides a method in which, if the encoded picture signal is a color picture signal, it is checked, based on the luminance components, whether or not the coefficients of the chroma components are significant, for efficiently encoding the coefficients of chroma components by run-length encoding.

According to the present invention, the input picture signal is split by subband splitting into plural frequency bands for generating signals of plural frequency bands. The signals of the respective frequency bands are quantized for generating quantized signals of the respective frequency bands. From these quantized signals of the respective frequency band, the coefficients existing at the same spatial positions of the respective layers resulting from spectrum splitting are extracted for generating a coefficient tree. This coefficient tree is S-scanned in a direction proceeding from the low frequency band towards the high frequency band for generating a scan sequence which is run-length encoded for generating encoded data.

According to the present invention, the encoded data, obtained as described above, is decoded by run-length decoding for generating a scan sequence from which a coefficient tree is re-constructed. The coefficients of the re-constructed coefficient tree located at the same spatial positions in the respective layers and the coefficients located at the same spatial positions are dequantized for generating signals of the plural frequency bands. These signals are decoded by subband decoding for reproducing the original input picture signal.

BRIEF DESCRIPTION OF THE DRAWINGS

FIG. 7 shows an array of plural coefficient trees made up of neighboring coefficients.

DESCRIPTION OF THE PREFERRED EMBODIMENTS

Figure 1:
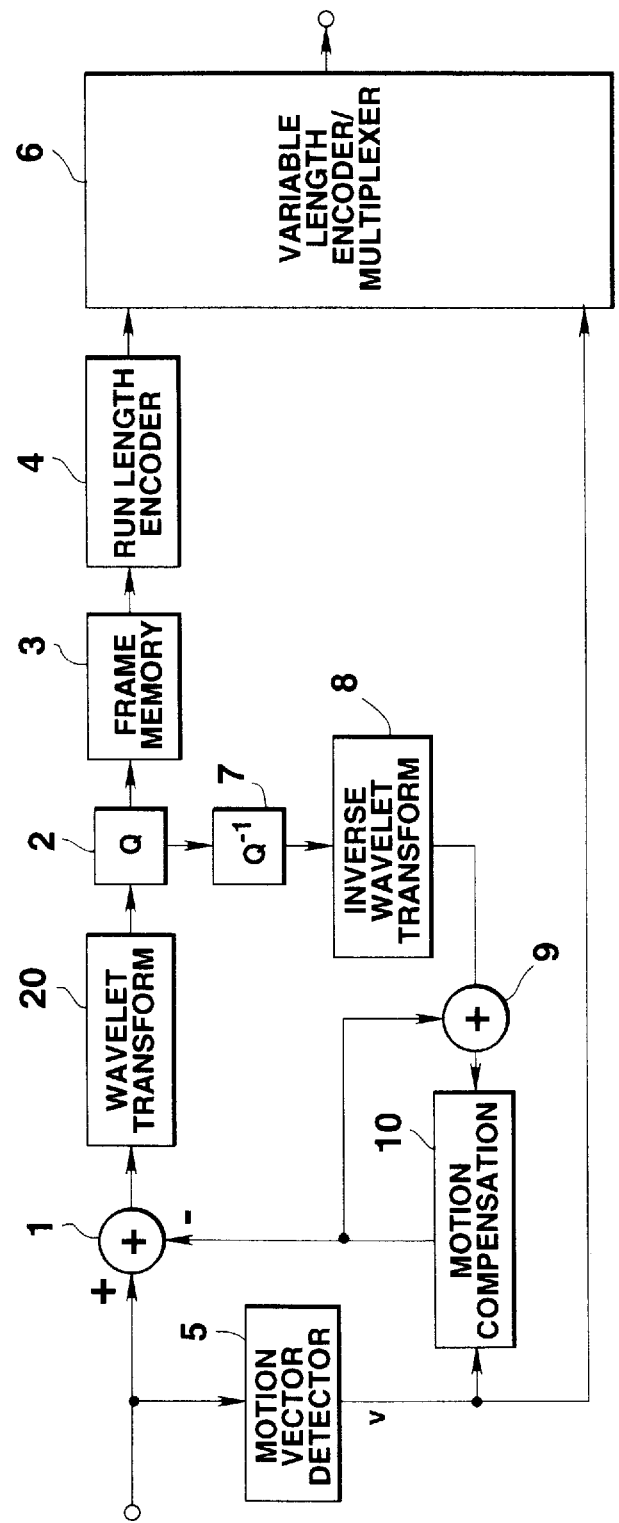
FIG. 1 is a block diagram showing an illustrative circuit structure of a picture signal encoder embodying the present invention.

Referring to the drawings, preferred embodiments of the picture encoding method and apparatus and the picture decoding method and apparatus will be explained in detail. In the following first embodiment, the present invention is applied to a picture signal encoder in which an input picture signal is encoded by subband encoding using, for example, the wavelet transform.

Referring to FIG. 1, the picture signal encoder includes an adder 1 for finding the difference between an input picture signal and a prediction picture signal as later explained for generating a prediction error signal, and a wavelet transform unit 20 for splitting the prediction error signal from the adder 1 into signals of plural frequency bands using, for example, the wavelet transform.

The picture signal encoder also includes a quantizer 2 for quantizing the signals of the respective frequency bands from the wavelet transform unit 20 for generating quantized signals of the plural frequency bands, and a frame memory 3 for extracting coefficients of the quantized frequency band signals present in the same spatial positions of respective layers resulting from frequency splitting for generating a coefficient tree and S-scanning the coefficient tree from the low frequency band towards the high frequency band for generating a scan sequence.

The picture signal encoder also includes a run-length encoding unit 4 for run-length encoding the scan sequence for generating encoded data, and a motion vector detection unit 5 for motion detecting the input picture signal using the prediction picture signal for generating the motion vector information.

The picture signal encoder further includes a variable length encoding/multiplexing unit 6 for variable length encoding and multiplexing the encoded data and the motion vector information and outputting the resulting data, and a so-called local decoder for predictive coding, that is a dequantizer 7, an inverse wavelet transform unit 8, an adder 9 and a motion compensator 10.

The adder 1 computes a difference between the input picture signal and the prediction picture signal supplied from the motion compensator 10 to generate a prediction error signal which is then supplied to the wavelet transform unit 20 by way of performing the so-called inter-picture predictive coding. If there is no temporal correlation between the input picture signal and the prediction picture signal, as in case of a scene change, the motion compensator 10 outputs a zero signal, and the adder 1 directly outputs the input picture signal, by way of performing intra-picture coding.

Figure 2:
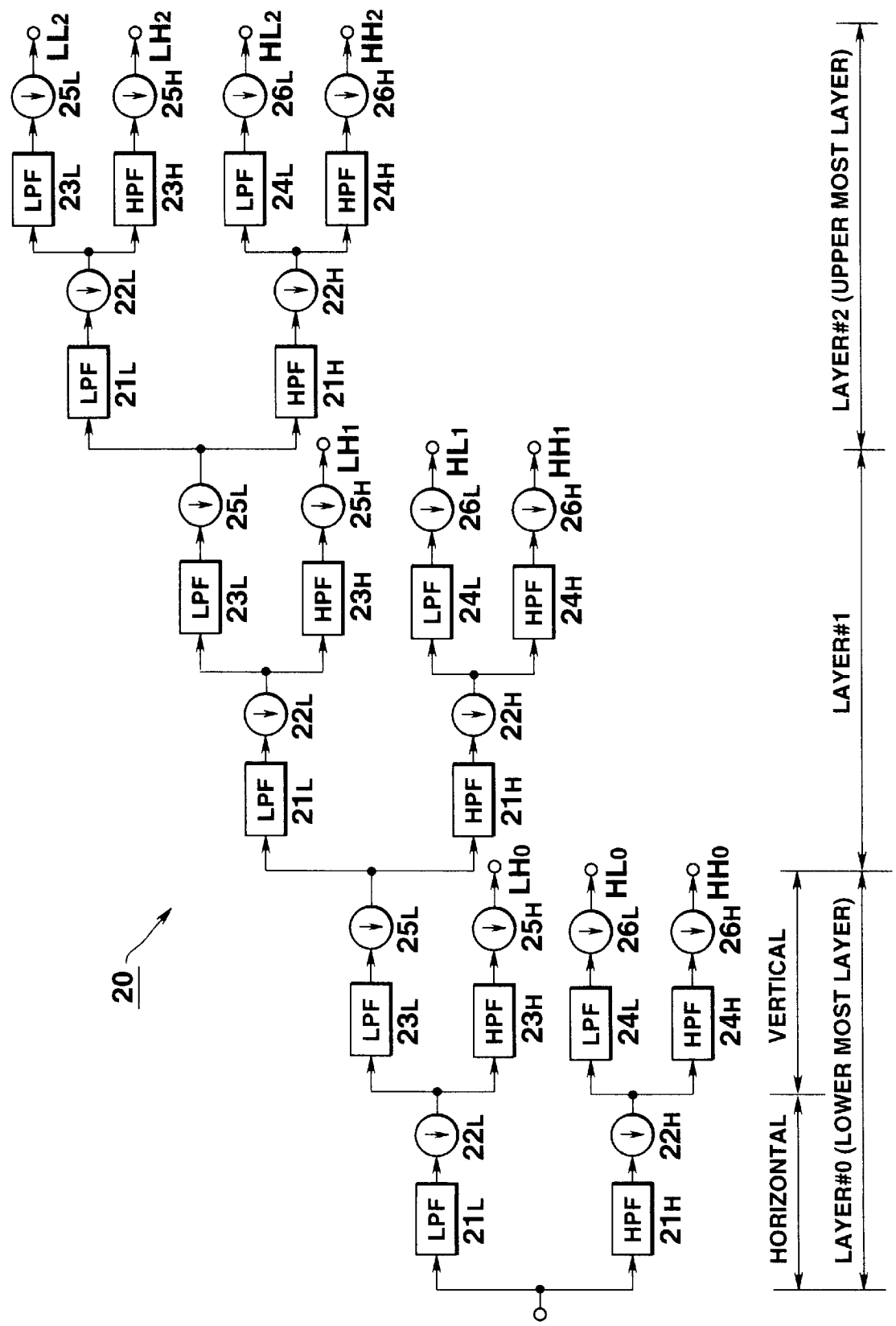
FIG. 2 is a block diagram showing an illustrative circuit structure of a wavelet transform unit constituting the picture signal encoder shown in FIG. 1.

The waveform transform unit 20 is made up of waveform transform unit sections for performing, for example, three-stage spectrum splitting. Referring to FIG. 2, each stage is made up of:

a low-pass filter (LPF) $21_L$ and a high-pass filter (HPF) $21_H$ for splitting the prediction error signal from the adder 1 into a low frequency band signal and a high frequency band signal in the horizontal direction of a picture, respectively;

downsampling units $22_L$, $22_H$ for downsampling signals of the respective frequency bands obtained by the LPFs $21_L$, $21_H$;

an LPF $23_L$ and an HPF $23_H$ for splitting the downsampled low-frequency band signal in the horizontal direction into a low frequency band signal and a high frequency band signal in the vertical direction of a picture, respectively;

an LPF $24_L$ and an HPF $24_H$ for splitting the downsampled high-frequency band signal in the horizontal direction into a low frequency band signal and a high frequency band signal in the vertical direction of a picture, respectively; and downsampling units $25_L$, $25_H$, $26_L$, $26_H$ for downsampling output signals of the LPF $231_L$, HPF $23_H$, LPF $24_L$ and HPF $24_H$.

The LPF $231_L$, HPF $23_H$, LPF $24_L$ and HPF $24_H$ of each stage are formed by, for example, a linear-phase FIR filter. For example, the first-stage LPF $21_L$ passes a low-frequency band signal, which is a low-frequency component of picture signals supplied in the sequence of horizontal scanning of a picture, and transmits the signal to the downsampling unit $22_L$, while the HPF $21_H$ passes the high-frequency band signal, which is the high-frequency component of the picture signal, and transmits the resulting signal to the downsampling unit $22_H$.

The downsampling units $22_L$, $22_H$ decimates every other sample of the low-frequency band signal and the high-frequency band signal by way of performing downsampling, and sends the downsampled low frequency band signal and high frequency band signal to the LPF $23_L$, HPF $23_H$, LPF $24_L$ and HPF $24_H$, respectively.

Figure 3:
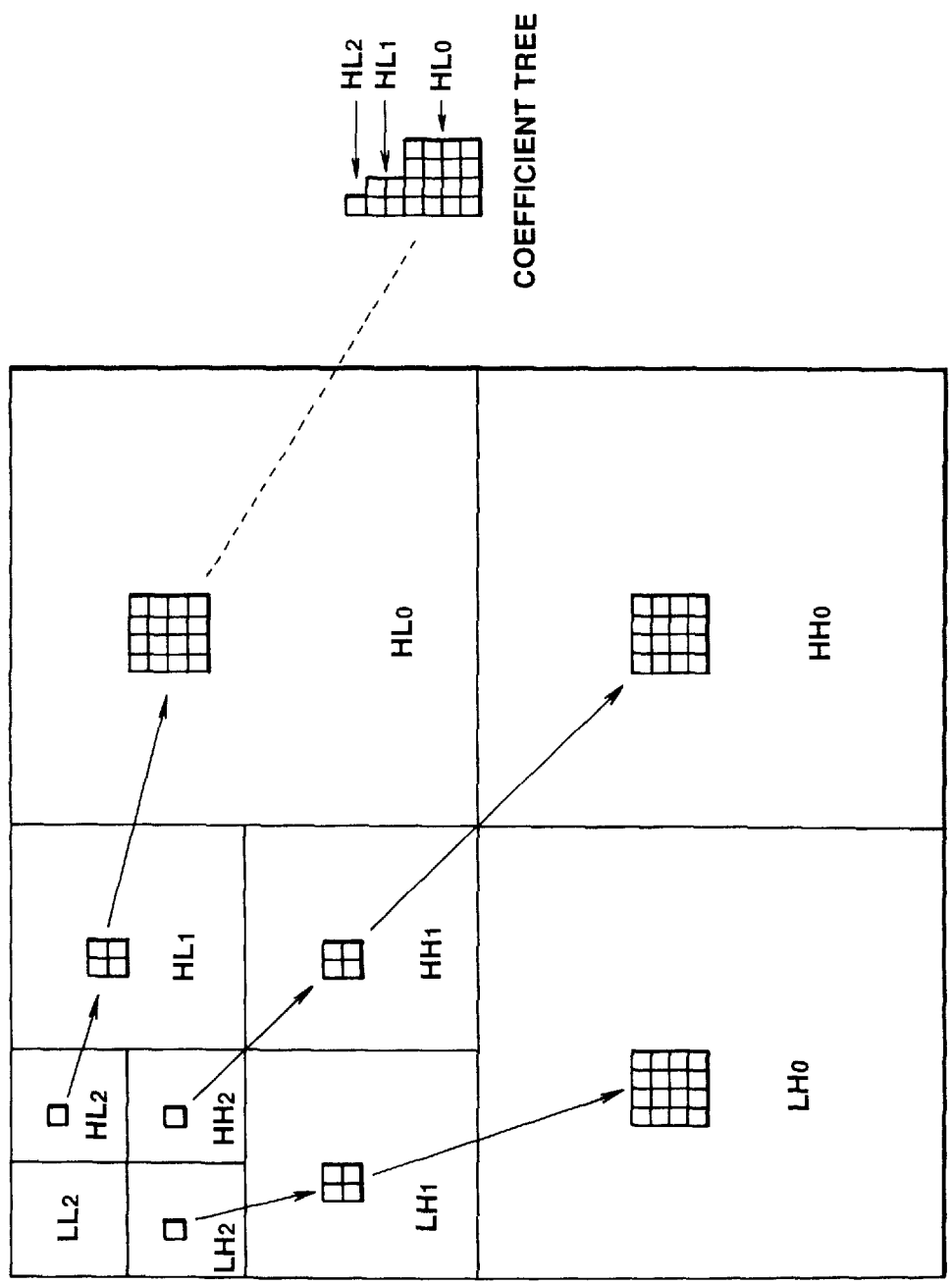
FIG. 3 shows an array of transform coefficients in three-layer wavelet transform.

The LPF $23_L$ and the HPF $23_H$ further split the low frequency band signal in the horizontal direction of the picture supplied from the downsampling unit $22_L$ into two frequency bands in the vertical direction of the picture. The LPF $23_L$ sends the low frequency band signals belonging to the low-frequency band in both the horizontal and vertical directions, that is coefficients belonging to groups other than the layer 0 groups, namely $HL_0$, $HH_0$ and $LH_0$ in wavelet transform, as shown in FIG. 3, to the second-stage LPF $21_L$ and HPF $21_H$. The HPF $23_H$ sends the signal the horizontal direction of which belongs to the low frequency band and the vertical direction of which belongs to the high frequency band, that is the coefficients of the group $LH_0$ of the layer 0, to the quantizer 2 shown in FIG. 1.

The LPF $24_L$ and the HPF $24_H$ further split the high frequency band signal in the horizontal direction of the picture supplied from the downsampling unit $22_H$ into two frequency bands in the vertical direction of the picture. The LPF $24_L$ sends the signal the horizontal direction of which belongs to the high frequency band and the vertical direction of which belongs to the low frequency band, that is coefficients belonging to the group $HL_0$ of the layer 0, to the quantizer 2. The HPF $24_H$ sends the signal belonging to the high-frequency band in both the horizontal and vertical directions, that is the coefficients of the group $HH_0$ of the layer 0, to the quantizer 2.

Similarly to the components from the LPF $21_L$ to the downsampling unit $26_H$ of the first stage, the components from the LPF $21_L$ to the downsampling unit $26_H$ of the second and third stages split the low frequency band signals, which are supplied from the previous stage downsampling unit $25_L$ and the horizontal and vertical directions of which belong the low frequency band, into four groups.

Meanwhile, the operation of the LPF $21_L$ to the downsampling unit $26_H$ of the second and third stages is the same as that of the components from the LPF $21_L$ to the downsampling unit $26_H$ of the first stage and hence the description therefor is omitted for simplicity.

The quantizer 2 quantizes transform coefficients belonging to the groups of the layer 0, that is $HL_0$, $HH_0$ and $LH_0$, supplied respectively from the first-stage downsampling units $26_H$, $26_L$ and $25_H$, second-stage downsampling units $26_H$, $26_L$ and $25_H$ and the third-stage downsampling units $26_H$, $26_L$ and $25_H$, transform coefficients belonging to the groups of the layer 1, that is $HH_1$, $HL_1$ and $LH_1$ and transform coefficients belonging to the groups of the layer 2, that is $HH_2$, $HL_2$, $LH_2$ and $LL_2$, using quantization steps which become smaller towards the upper layer, and sends the resulting quantization coefficients to the frame memory 3.

Figure 4:
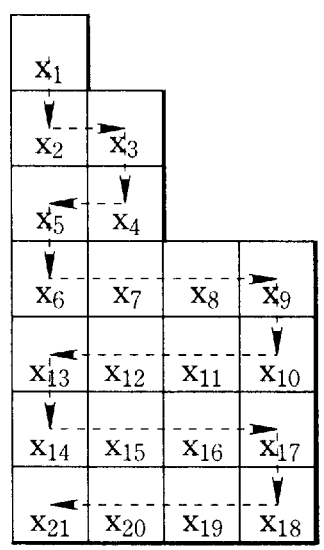
FIG. 4 illustrates the scanning sequence for a coefficient tree.

The frame memory 3 transiently stores a frame of quantization coefficients, supplied from the quantizer 2, in a matrix configuration so that the layer will become junior from upper left to lower right, as shown in FIG. 3, and subsequently extracts the quantization coefficients present in the same spatial positions of the respective layers to generate a coefficient layer. The frame memory then reads out the coefficient tree by S-scanning from the low frequency band towards the high frequency band so that neighboring quantization coefficients in the same frequency band will be arrayed contiguously in an order of $x_1$, $x_2$, $x_3$, $x_4$, . . . as shown in FIG. 4. The resulting string of the S-scanned quantization coefficients, referred to herein as a scan sequence, is supplied to a run-length encoding unit 4. The S-scanning order is not limited to the above-described illustrative example. That is, it suffices if neighboring quantization coefficients belonging to the same frequency band are arrayed consecutively to one another. For example, the quantization coefficients belonging to the group $HL_1$ of the layer 1 may be S-scanned in the order of $x_2$, $x_5$, $x_4$, $x_3$. The frame memory 3 directly sends the signals of the lowermost frequency band, such as quantization coefficients belonging to the group $LL_2$ of the layer 2 to the run-length encoding unit 4 without using it as data constituting a coefficient tree.

Figure 5:
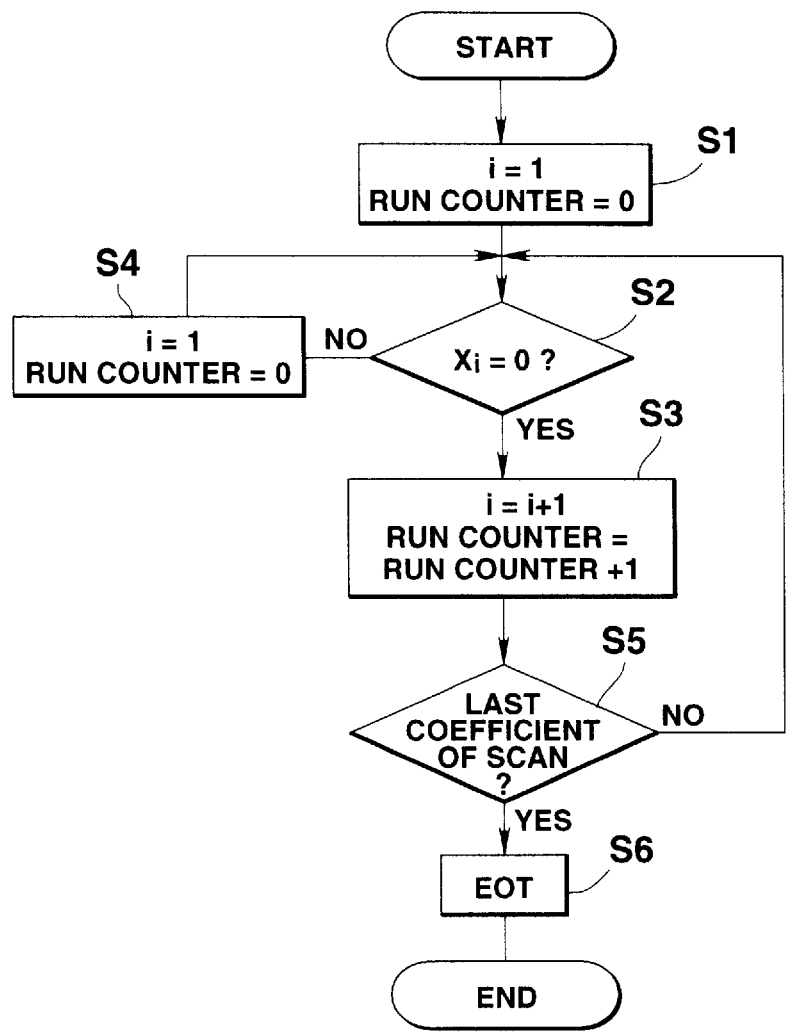
FIG. 5 is a flowchart for illustrating the operation for scanning a coefficient tree.

The run-length encoding unit 4 run-length encodes the quantization coefficients read out from the frame memory 3 in the in the S-scan sequence. Specifically, the run-length encoding unit 4 has a run-counter and a register indicating the order of the quantization coefficients, and operates in accordance with a flowchart shown in FIG. 5. The value of the register is set herein to i.

At step S1, the run-length encoding unit sets i (i=1 to n) and initializes the run-counter. That is, the run-length encoding unit sets i and the run-counter to 1 and 0, respectively, before proceeding to step S2.

At step S2, the run-length encoding unit 4 judges whether or not the quantization coefficient $x_i$ is an insignificant coefficient. If the result is NO, that is if the quantization coefficient $x_i$ is a significant coefficient, the encoding unit 4 proceeds to step S4. The quantization coefficients $x_1$ and $x_n$ of the scan sequence represent an uppermost layer coefficient and a lowermost layer coefficient, respectively.

At step S3, the run-length encoding unit 4 sets i=i+1 and run-counter=run-counter+1, before proceeding to step S5.

At step S4, the run-length encoding unit 4 sets i=1 and the run counter=0, before reverting to step S2.

At step S5, the run-length encoding unit 4 judged whether or not the last quantization coefficient $X_n$ of the scan sequence has been arrived at. if the result is NO, the encoding unit reverts to step S2 and, if otherwise, the encoding unit proceeds to step S6.

At step S6, the run-length encoding unit 4 generates an end-of-tree (EOT) code indicating the last coefficient of the coefficient tree.

The run-length encoding unit 4 sends the significant coefficients, the run-counter value indicating the number of the contiguous insignificant coefficients and the EOT code to the variable length encoder/multiplexer 6. It is noted that neighboring coefficients in the same frequency band in the sub-band/wavelet transform exhibit high correlation. For example, if a given coefficient is insignificant, the probability is high that the coefficients neighboring thereto are also insignificant. Conversely, if a given coefficient is significant, the probability is high that coefficients neighboring thereto are also significant. On the other hand, run-length encoding is effective for a long concatenation of the same symbols. Thus it is possible with the present run-length encoding unit 4 to grasp almost all of the correlation between the coefficients in the same frequency band, thus assuring efficient encoding of the quantization coefficients. Meanwhile, if the input picture signal is an intra-coded picture signal, the run-length encoding unit 4 encodes the signal in the lowermost frequency band, that is the quantization coefficients belonging to the group $LL_2$ of the layer 2, by differential PCM (DPCM), and sends the resulting data to the variable length encoding/multiplexing unit 6.

The variable length encoding/multiplexing 6 encodes the quantized significant coefficient $x_i$, run-counter value (number of runs) and the EOT code supplied from the run-length encoding unit 4 and the motion vector V supplied from the motion vector detector 5 by an encoding method of a high compression efficiency, for example, Huffman encoding [3], variable length encoding (VLC) or arithmetic coding [4], and sends the resulting encoded data to a transmission path or a recording medium, not shown.

The dequantizer 7, inverse wavelet transform unit 8, adder 9 and the motion compensator 10 make up a so-called local decoder in predictive coding. That is, the dequantizer 7 dequantizes the quantization coefficients supplied from the quantizer 2 for generating transform coefficients corresponding to the output of the wavelet transform unit 20. The inverse wavelet transform unit 8 inverse wavelet transforms the wavelet transform coefficients for reproducing prediction error signals corresponding to the output of the adder 1, while the adder 9 sums the prediction error signal supplied to the adder 1 and the prediction error signal for reproducing the picture signals corresponding to the input to the adder 1 in order to send the picture signal to the motion compensator 10. The motion compensator 10 includes a frame memory for transient storage of the picture signal. When encoding the picture signal of the next frame, the motion compensator 10 reads out the picture signals stored therein, based on the motion vector V supplied from the motion vector detector 5, and sends the resulting signal as the prediction picture signal to the adder 1, as explained previously. The local decoder is substantially of the same structure as the picture signal decoder as later explained, and hence the detailed description of the inverse wavelet transform unit 8 is not made for simplicity.

As will become clear from the foregoing description, the picture signal encoder according to the present invention applies run-length encoding to the coefficient tree of subband/wavelet transform. Meanwhile, the probability of occurrence of insignificant coefficients or zero-value coefficients is increased in a direction proceeding from the uppermost layer to the lowermost layer. Therefore, by starting the scan sequence for the quantization coefficients in the run-length from the uppermost layer of the coefficient tree, the quantization coefficients can be run-length encoded more efficiently than is possible with conventional encoding. Moreover, with the present picture signal encoder, since only the value of the run-counter specifying the number of contiguous insignificant coefficients (number of runs) and the EOT code are sent in place of the value of the insignificant coefficients themselves, thus reducing the quantity of data sent over the transmission route. In particular, if all coefficients of the coefficient tree are insignificant, only one code (EOT) suffices for encoding the coefficient tree as in the case of a zero-tree system discussed in connection with the prior art. In addition, with the present picture signal encoder, efficient encoding may be realized if several beginning coefficients in the scan sequence are significant and the remaining coefficients thereof are all insignificant.

Another illustrative example of run-length encoding of a coefficient tree is now explained.

Although the coefficient trees are run-length encoded one-by-one in the above example, since the wavelet transform coefficients in the same frequency band exhibit high correlation between neighboring coefficients, encoding with a higher encoding efficiency can be realized by applying run-length encoding to a set of plural coefficient trees composed of neighboring transform coefficients.

Figure 6:
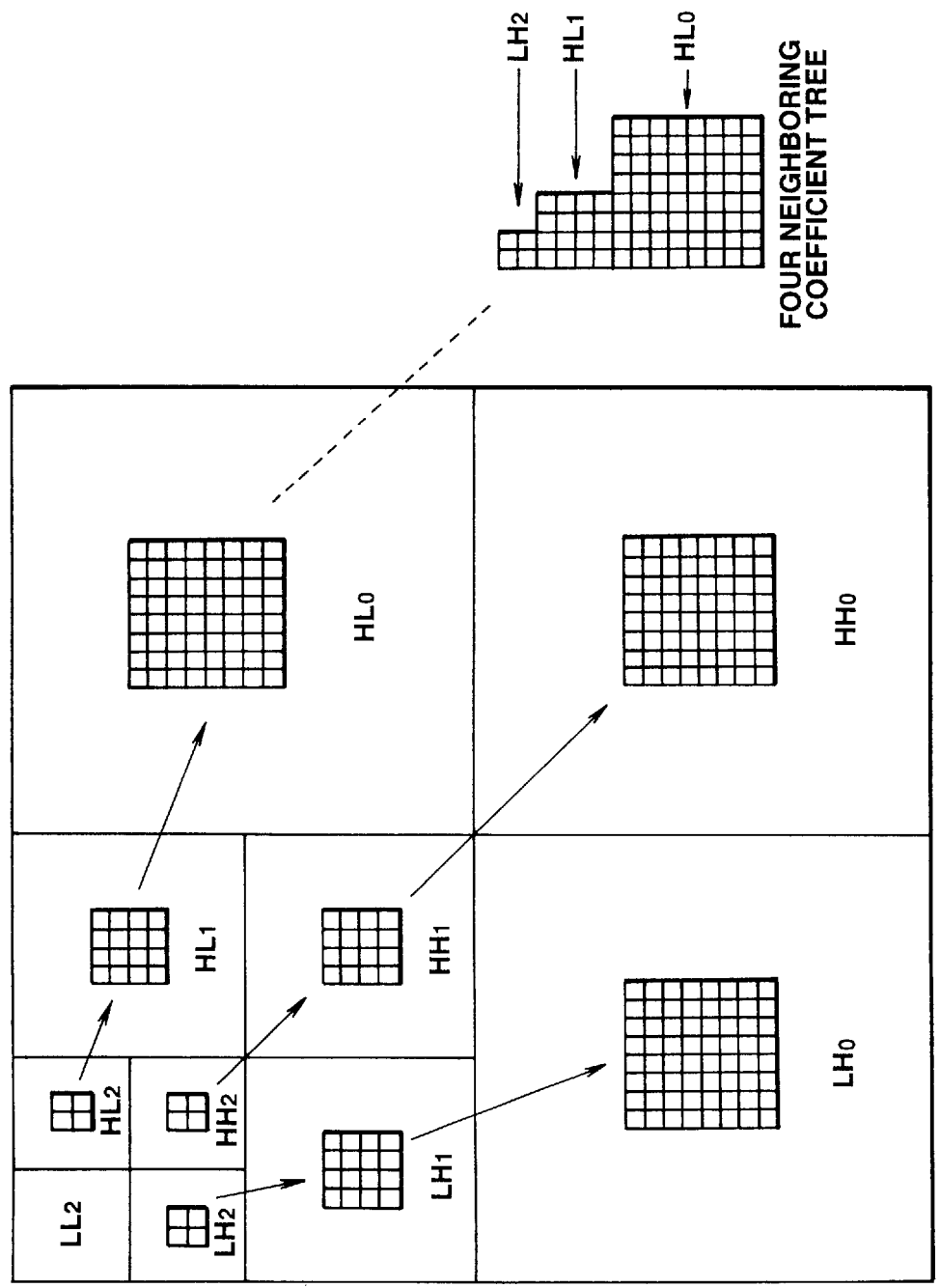
FIG. 6 shows an array of plural coefficient trees made up of neighboring coefficients.
Figure 7:
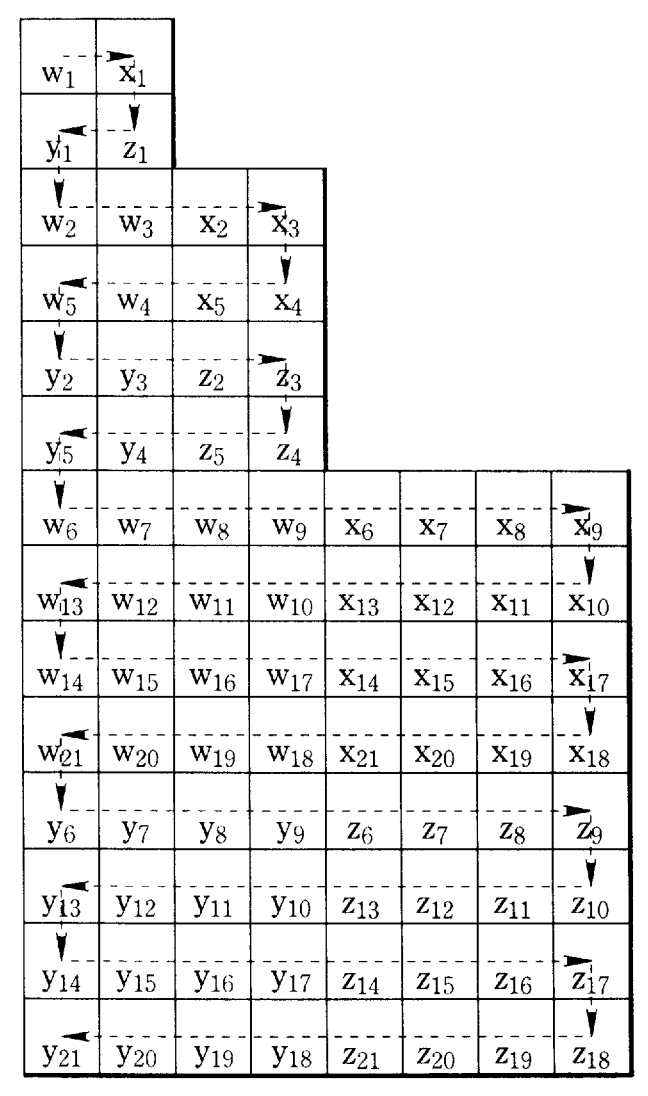

Specifically, four neighboring quantization coefficients belonging to the group $HL_2$ of the layer 2 are selected and quantization coefficients of the respective layers present at the same spatial positions as these four coefficients are extracted to generate four coefficient trees, as shown in FIG. 6. Specifically, a coefficient tree made up of quantization coefficients $w_1, w_2, w_3, w_4, \ldots$, a coefficient tree made up of quantization coefficients $x_1, x_2, x_3, x_4, \ldots$, a coefficient tree made up of quantization coefficients $y_1, y_2, y_3, y_4, \ldots$, and a coefficient tree made up off quantization coefficients $z_1, z_2, z_3, z_4, \ldots$ are generated, as shown in FIG. 7. The quantization coefficients in the four neighboring coefficient trees are read out by S-scanning from the low frequency band towards the high frequency band so that neighboring coefficients in the same frequency band will be arrayed consecutively, that is, in an order of the quantization coefficients $w_1, x_1, z_1, y_1, w_2, w_3, x_2, x_3, x_4, \ldots$ as shown in FIG. 7. The scan sequence of the S-scanned quantization coefficients is supplied to the run-length encoding unit 4. The result is that, by simultaneously encoding plural coefficient trees made up of neighboring transform coefficients and in which, if a given coefficient is insignificant, the neighboring coefficients are likely to be insignificant, the quantization coefficients can be encoded with a higher compression ratio. Meanwhile, if the several beginning coefficients of the scan sequence are significant, with the remaining coefficients of the scan sequence being all insignificant, efficient encoding can be realized. However, if an isolated significant coefficient is intruded into the remaining scan sequence portion of the insignificant coefficients, the amount of data is increased for encoding the isolated coefficients. An illustrative example of the run-length encoding in case isolated significant coefficients are present in the sequence of the insignificant coefficients is now explained.

Figure 8:
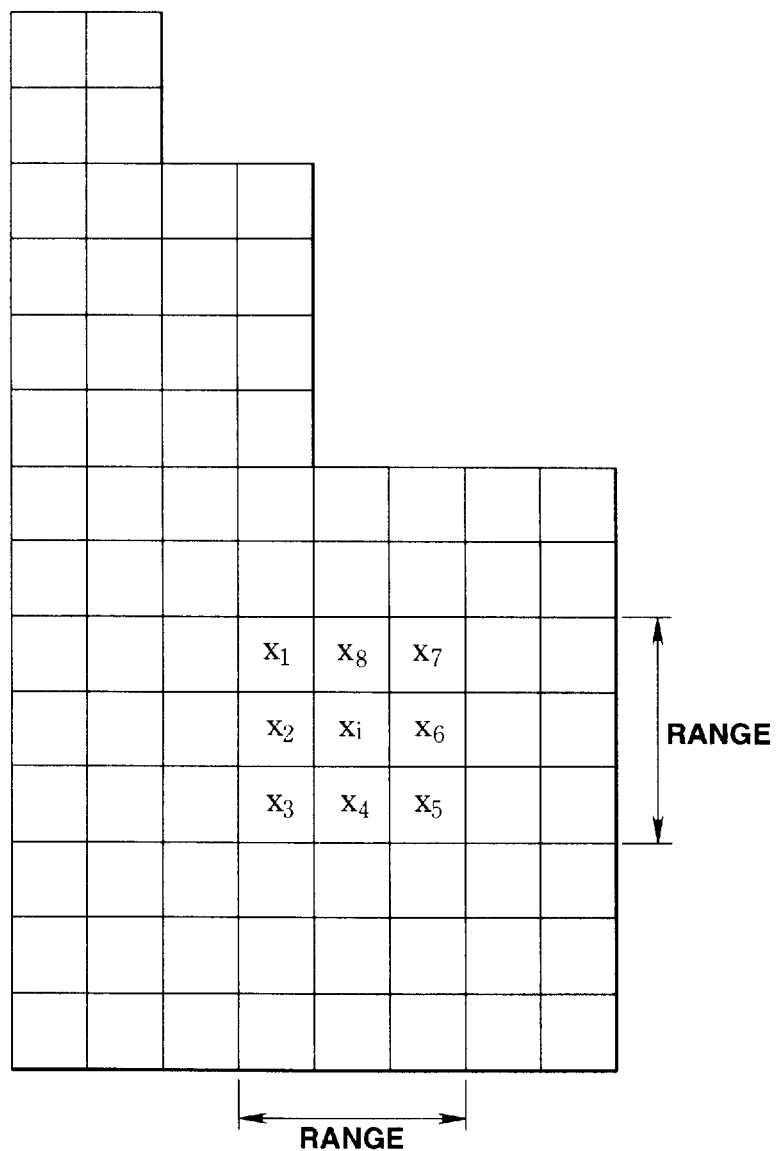
FIG. 8 illustrates an isolated coefficient.

If the isolated significant coefficient belongs to the lowermost layer and is of a small value, such isolated coefficient can be regarded as being insignificant coefficient. That is, the isolated coefficient does not essentially influence the quality of the encoded picture and hence can be discarded. Therefore, if eight coefficients $x_1$ to $x_8$ neighboring to the isolated coefficient $x_i$ are insignificant and the value of the isolated coefficient $x_i$ is smaller than a pre-set threshold T, as shown in FIG. 8, this isolated coefficient is deemed to be insignificant.

Figure 9:
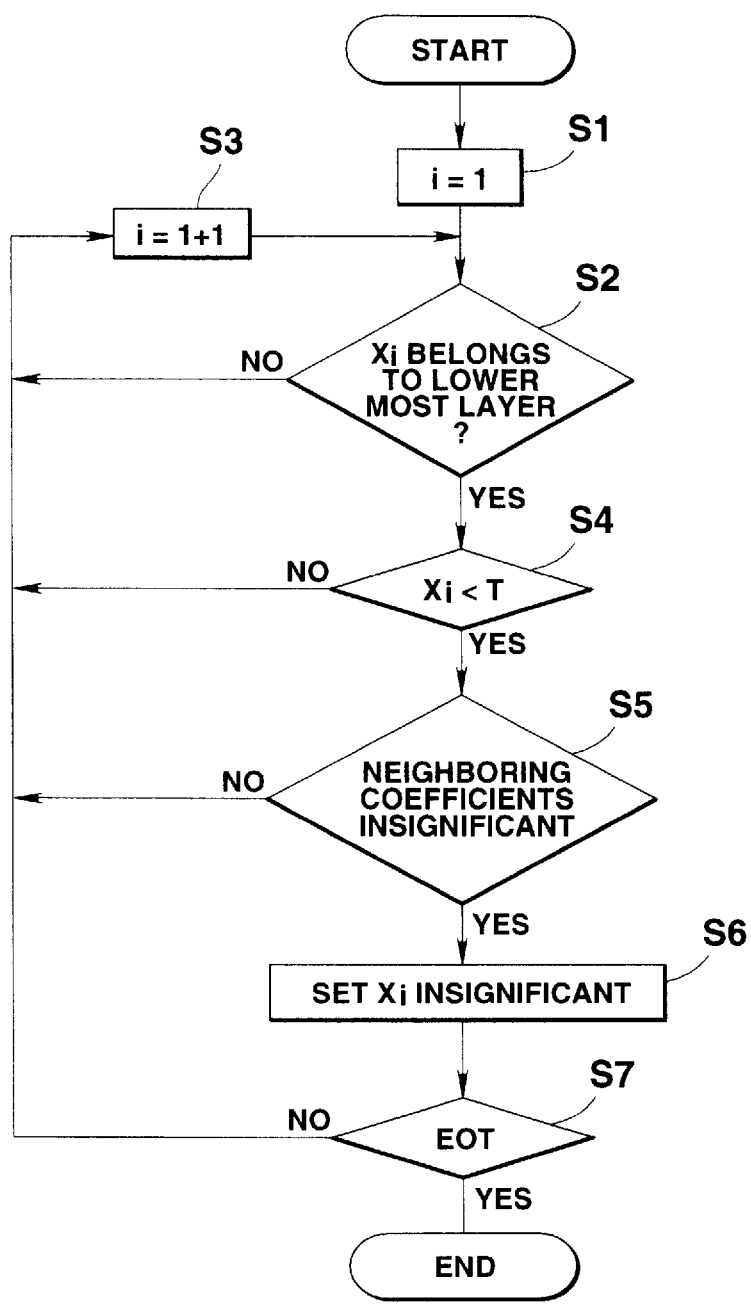
FIG. 9 is a flowchart for illustrating the operation in which the isolated coefficient is set as an insignificant coefficient.

Specifically, if the scan sequence of the quantization coefficients is i, where i=1 to n, the run-length encoding unit 4 operates in accordance with the flowchart shown for example in FIG. 9.

At step S1, the run-length encoding unit 4 sets i to 1 before proceeding to step S2.

At step S2, the run-length encoder 4 judged whether or not the quantization coefficient $x_i$ belongs to the lowermost layer. If the result is NO, the run-length encoding unit 4 proceeds to step S3 and, if otherwise, the encoding unit proceeds to step S4.

At step S3, the run-length encoding unit 4 sets i=i+1 before reverting to step S2.

At step S4, the run-length encoding unit 4 judged whether or not the quantization coefficient $x_i$ is smaller than the pre-set threshold T. If the result is NO, the run-length encoding unit 4 proceeds to step S3 and, if otherwise, the encoding unit proceeds to step S5.

At step S5, the run-length encoding unit 4 judges whether or not the quantization coefficients neighboring to the quantization coefficient $x_i$ are all insignificant. If the result is NO, the run-length encoding unit 4 proceeds to step S3 and, if otherwise, the encoding unit proceeds to step S6.

At step S6, the run-length encoding unit 4 deems the quantization coefficient $x_i$ to be an insignificant coefficient before proceeding to step S7.

At step S7, the run-length encoding unit 4 judges whether or not the EOT state exists. If the result is NO, the run-length encoding unit 4 reverts to step S2 and, if otherwise, the encoding unit terminates processing.

Thus the run-length encoding unit 4 can positively detect the significant coefficient present in the sequence of the insignificant coefficients and which does not deteriorate picture quality, and deems such significant coefficient to be insignificant to enable efficient run-length encoding of the quantization coefficients. Although it is checked in the above description whether or not eight coefficients neighboring to the isolated coefficients is insignificant, the range of the judgment of the coefficients may be broader around the isolated coefficient without being limited to the above range.

The run-length encoding in case the input signal is a color picture signal is explained.

There exists high correlation between insignificant coefficients of the luminance components and the chroma components making up a color picture signal. In a majority of cases, if all coefficients in a coefficient tree of luminance coefficients are insignificant, the coefficients of the coefficient tree of the corresponding chroma components are all insignificant. Besides, if the coefficients of the coefficient tree of the luminance components are small and isolated, the corresponding coefficients of the luminance components are thought to be insignificant.

Thus, if all of the coefficients of the coefficient tree of the luminance components are insignificant, the run-length encoding unit 4 performs run-length encoding on the assumption that the coefficients of the coefficient tree of the corresponding chroma components are all insignificant. In addition, if the coefficients of the luminance components are "not so significant", that is if the coefficients $x_i$ (i=1 to n) in the scan sequence of the coefficient tree of the luminance components are not higher than the threshold T and the coefficients located in a pre-set range around the coefficient $x_i$ are insignificant, as shown in FIG. 8, the run-length encoding unit 4 performs encoding on the assumption that the coefficients of the corresponding chroma components are insignificant. Thus, if the coefficients of the chroma components are significant, these can be assumed to be insignificant under the above-mentioned condition, thus assuring efficient encoding of the coefficients of the chroma components.

The picture signal decoder according to the present invention is now explained.

Figure 10:
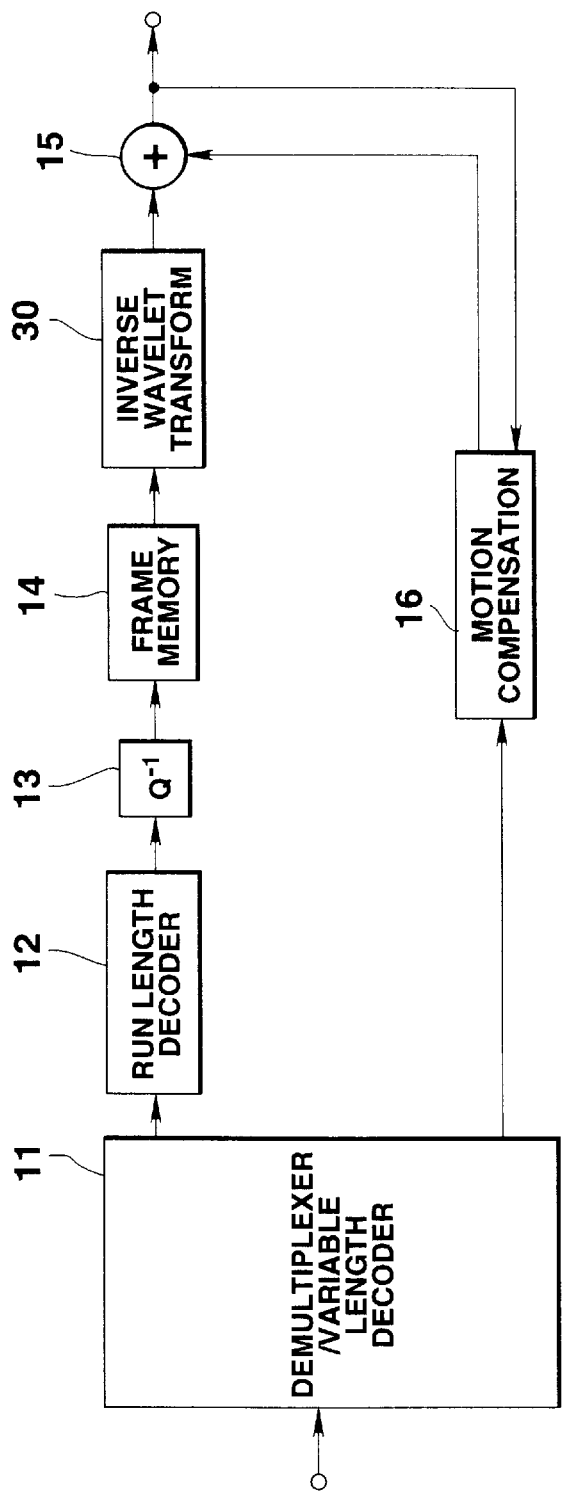
FIG. 10 shows an illustrative circuit structure of a picture signal decoder embodying the present invention.

Referring to FIG. 10, the picture signal decoder according to the present invention includes:

a demultiplexing/variable length decoder 11 for separating data sent from the above-mentioned picture signal encoder and variable-length decoding the data for reproducing the encoded data and the motion vector information;

a run-length decoding unit 12 for dequantizing the quantization coefficients supplied from the run-length decoding unit 12 in the scan sequence for reproducing quantization coefficients of the scan sequence;

a frame memory 14 for re-constructing the coefficient tree from the coefficients supplied from the dequantizer 13 in the scan sequence and locating the coefficients of the re-constructed coefficient tree in the same spatial positions of the respective layers for storage therein;

an inverse wavelet transform unit 30 for inverse wavelet transforming the coefficients located in the same spatial positions of the respective layers for reproducing signals of plural frequency bands;

an adder 15 for summing the prediction error signal from the inverse wavelet transform unit 30 and the prediction picture signal for reproducing the original picture signal; and a motion compensator 16 for transiently storing picture signals from the adder 15, reading out the picture signals with motion compensation during decoding of the next picture signal and sending the read-out motion-compensated signal to the adder 15 as the prediction picture signal.

The data directly transmitted from the picture signal encoder over a transmission route to the picture signal decoder, or data reproduced from the recording medium so as to be supplied to the picture signal decoder, are encoded data generated by sub-band coding the input picture signal in the picture signal encoder to form signals of plural frequency bands, quantizing the signals of the respective frequency bands, extracting coefficients present at the same spatial positions of the respective layers of the quantized signals of the respective frequency bands resulting from band splitting, and S-scanning the coefficient tree from the low frequency band to the high frequency band for forming an S-scan sequence and run-length encoding the scan sequence. The demultiplexing/variable length decoder 11 separates the encoded data and the motion vector V from the data and performs decoding which is a reverse operation of that performed by the variable length encoder/multiplexer 6 for reproducing run-length encoded quantization coefficients. The demultiplexing/variable length decoder 11 routes the run-length encoded quantization coefficients to the run-length decoding unit 12 while routing the motion vector V to the motion compensator 16.

The run-length decoding unit 12 run-length decodes the run-length encoded quantization coefficients to reproduce quantization coefficients, which are then supplied to the dequantizer 13. The dequantizer 13 has the same quantization steps as that of the dequantizer 7 of the picture encoder and, using this quantization step, reproduces the coefficients in wavelet transform to transmit the coefficients in the scan sequence to the frame memory 14.

The frame memory 14 re-constructs the coefficient tree from the coefficients supplied thereto in the span sequence and locates the coefficients of the reconstructed coefficient tree in the same spatial positions of the respective layers for storage therein. The frame memory 14 then reads out the coefficients of the same frequency bands together and routes the read-out coefficients to the inverse waveform transform unit 30. Specifically, the frame memory 14 reads out the coefficients in terms of the groups $LL_2$, $LH_2$, $HL_2$ and $HH_2$ of the layer 2 and groups $LH_1$, $HL_1$, ... of the layer 1, as shown in FIG. 3 and routes the read-out coefficients to the inverse waveform transform unit 30. In other words, the frame memory 14 routes, in the layer 2, the low frequency band signals belonging to the low frequency band in both the horizontal and vertical directions of the picture, the signals belonging to the low frequency band in only the horizontal direction, the signals belonging to the low frequency band in only the vertical direction, and the signals belonging to the high frequency band in both the horizontal and vertical directions, to the inverse wavelet transform unit 30.

Figure 11:
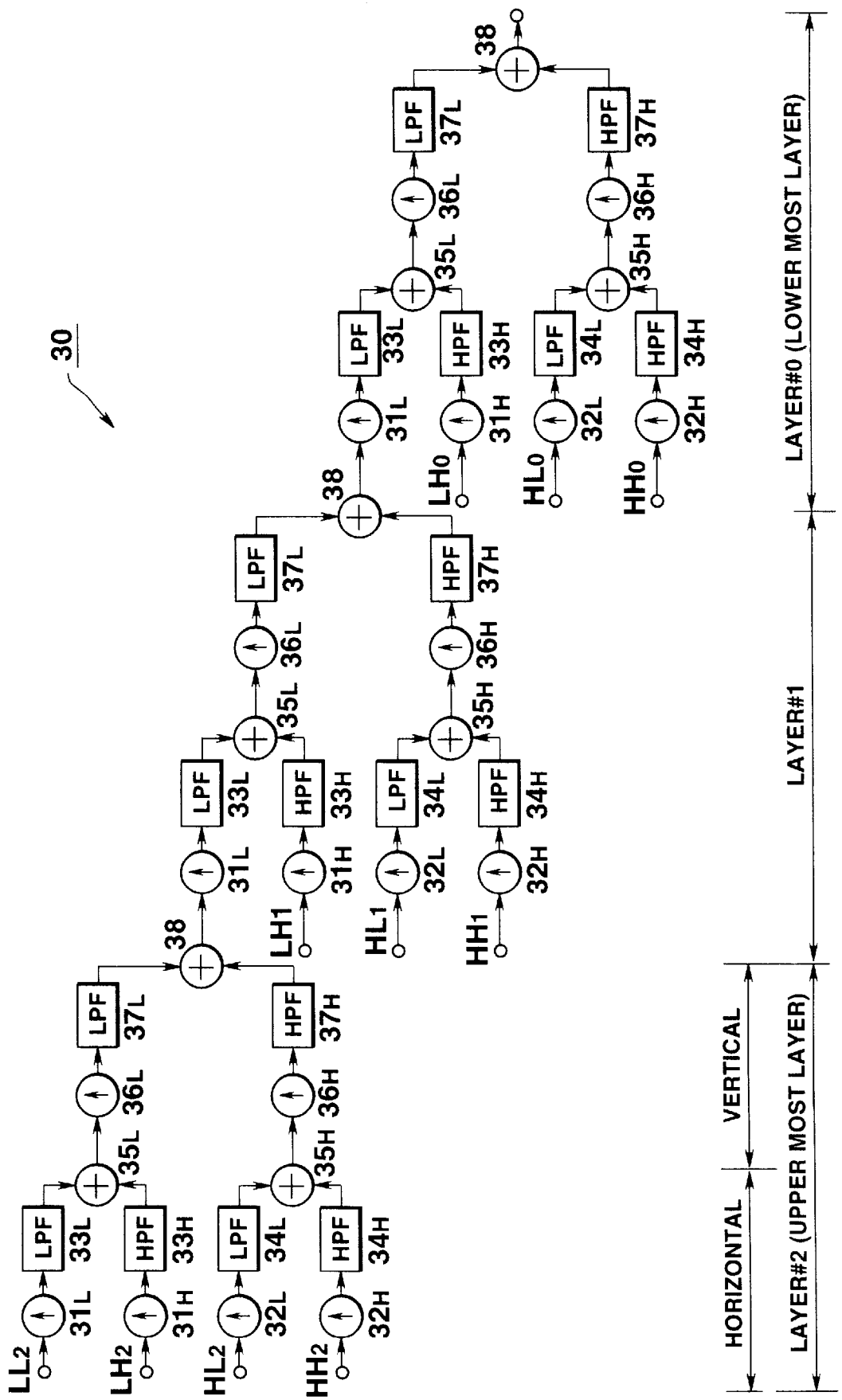
FIG. 11 shows an illustrative circuit structure of an inverse wavelet transform unit constituting the picture signal decoder shown in FIG. 10.

The inverse transform unit 30 is such an inverse transform unit performing, for example, three-stage band synthesis. Referring to FIG. 11, each stage of the transform unit 30 includes:

upsampling units $31_L$, $31_H$, $32_L$, $32_H$ for upsampling signals of the respective frequency bands of the layer 2 supplied from the frame memory 14;

an LPF $33_L$, an HPF $33_H$, an LPF $34_L$ and an HPF $34_H$ for interpolating the upsampled signals of the respective frequency bands;

adders $35_L$, $35_H$ for summing the signals from the LPF $33_L$ to HPF $34_H$;

upsampling units $36_L$, $36_H$ for upsampling output signals of the adders $35_L$, $35_H$;

an LPF $37_L$ and an HPF $37_H$ for interpolating signals from the upsampling units $36_L$, $36_H$; and an adder 38 for summing signals from the LPF $37_L$ and the HPF $37_H$.

In the layer 2 supplied from the frame memory 14, the third-stage upsampling units $31_L$, $31_H$, $32_L$, $32_H$ insert one-line all-zero signals between lines of the low-frequency band signals belonging to the low-frequency band signals in both the horizontal and vertical directions of the picture (group $LL_2$), signals belonging to the low frequency band only in the horizontal direction (group $LH_2$), signals belonging to the low frequency band only in the vertical direction (group $HL_2$), and the high-frequency band signals belonging to the high-frequency band signals in both the horizontal and vertical directions of the picture (group $HH_2$). The stages are numbered in a reverse fashion from the flow of signals for matching to the stages of the picture signal encoder.

The LPF $33_L$ to the HPF $34_H$ interpolate signals from the upsampling units $33_L$ to $34_H$ to route the resulting signals to the adders $35_L$, $35_H$. The adder $35_L$ sums the output signals of the LPF $33_L$ and HPF $33_H$, while the adder $35_H$ sums the output signals of the LPF $34_L$ and HPF $34_H$.

The upsampling units $36_L$, $36_H$ elongate the sample interval in the horizontal direction of the picture and insert zero-valued samples at the center of each sample to send the resulting signal to the LPF $37_L$ and HPF $37_H$.

The LPF $37_L$ and HPF $37_H$ interpolate output signals of the upsampling units $36_L$, $36_H$ to route the resulting signals to the adder 38. The adder 38 sums the output signals of the LPF $37_L$ and HPF $37_H$.

The adder 38 outputs a signal synthesized from the signals of the groups $LL_2$, $LH_2$, $HL_2$ and $HH_2$ of the layer 2. The synthesized signal is sent to the second-stage upsampling unit $31_L$ as a signal of the layer 1 belonging in both the horizontal and vertical directions to the low frequency band.

The second-stage upsampling units $31_H$, $32_L$ and $32_H$ other than the second-stage upsampling unit $31_L$ are directly fed from the frame memory 14 with signals belonging to the groups $LH_1$, $HL_1$ and $HH_1$ of the layer 1. The components from the upsampling unit $31_L$ to the adder 38 of the second stage operate similarly to the corresponding components of the first stage for synthesizing the signals of the respective frequency bands for reproducing signals of the layer 0 belonging to the low frequency band in both the horizontal and vertical directions for supplying the reproduced signal to the first-stage upsampling unit $31_L$. The components from the upsampling unit $31_L$ to the adder 38 of the first stage similarly synthesize signals of the respective frequency bands for reproducing a prediction error signal corresponding to the output of the adder 1 of the picture signal encoder and route the prediction error signal to the adder 15 shown in FIG. 10. Since the operation of the components from the upsampling unit $31_L$ to the adder 38 of the first and second stages is similar to that of the components from the upsampling unit $31_L$ to the adder 38 of the third stage, the same numerals are used and the corresponding description is omitted for simplicity.

The adder 15 sums the motion-compensated prediction picture signals supplied from the motion compensator 16 and the prediction error signals supplied form the inverse wavelet transform unit 30 to reproduce original picture signals, that is picture signals corresponding to the input to the adder 1 of the picture signal encoder in order to supply the picture signals to the motion compensator 16 and to a display device, such as a television receiver or a monitor receiver, not shown.

The motion compensator 16 has a frame memory for transient storage of the picture signals. When predictively decoding the picture signals of the next frame, the motion compensator reads out the stored picture signals with motion compensation based on the motion vector V supplied from the demultiplexing/variable length decoder 11 to transmit the read-out signals to the adder 15 as the prediction picture signal as described above.

The present invention is not limited to the above-described embodiments. For example, it is possible to increase the gain of the first-stage LPF and HPF, the gain of the second-stage LPF and HPF and the gain of the third-stage LPF and HPF of the wavelet transform unit 2 of the picture signal encoder in this order by, for example, a factor of a square of 2, and to afford the function of the quantizer to the wavelet transform unit 20, with the quantizer 2 and the dequantizer 7 being then omitted. In addition, although the wavelet transform is used for band splitting in the above-described embodiments, the input picture signal may also be split in frequency using, for example, a quadrature mirror filter. Furthermore, the number of stages of three used in the above embodiments may be increased to four or more without departing from the scope of the invention.

What is claimed is:

1. A picture signal encoding method comprising the steps of:

subband splitting an input picture signal for hierarchically splitting the frequency spectrum of said input picture signal into a plurality of frequency bands;

quantizing the signals of the frequency bands for generating quantized coefficients of a plurality of frequency bands;

extracting from said quantized coefficients those coefficients at the same relative spatial positions of the respective frequency bands, the extracted coefficients constituting a coefficient tree;

S-scanning said coefficient tree in a direction proceeding from the low frequency band towards the high frequency band for generating a scan sequence; and variable-length coding said scan sequence for generating encoded data.

2. The picture signal encoding method as claimed in claim 1, wherein said step of variable-length coding run-length encodes said scan sequence for generating said encoded data.

3. A picture signal encoding method in which an input picture signal is split in frequency into subbands for hierarchically splitting the frequency spectrum of said input picture signal into a plurality of frequency bands, and in which the picture signal split in frequency is variable-length coded and transmitted, comprising the steps of:

splitting the input picture signal into a high-frequency band signal and a low-frequency band signal, using a first stage low-pass filter and a high-pass filter;

downsampling signals of the respective frequency bands obtained by said step of splitting the input picture signal;

repeatedly frequency-splitting the down-sampled signals of the low frequency band using a pre-set low-pass filter and a high-pass filter for generating signals of the respective frequency bands;

quantizing the signals of the frequency bands obtained from the steps of downsampling signals and repeatedly frequency-splitting the down-sampled signals for generating quantized coefficients of plural frequency bands;

extracting from said quantized coefficients those coefficients in the same relative spatial positions of the respective frequency bands, the extracted coefficients constituting a coefficient tree;

S-scanning said coefficient tree in a direction proceeding from the low frequency band to the high frequency band for generating a scan sequence; and variable-length coding said scan sequence for generating encoded data.

4. The picture signal encoding method as claimed in claim 2, wherein it is judged in said step of variable-length coding said scan sequence whether the coefficient of said scan sequence is an insignificant coefficient or a significant coefficient and the number of consecutive insignificant coefficients in each frequency band is encoded in place of encoding the insignificant coefficients.

5. The picture signal encoding method as claimed in claim 3, wherein if an isolated coefficient occurs in said scan sequence which is of a value lower than a pre-set value, said isolated coefficient is deemed an insignificant coefficient.

6. The picture signal encoding method as claimed in claim 5, wherein if a respective coefficient in said scan sequence is not a zero coefficient and all coefficients neighboring said respective coefficient are all insignificant coefficients, said respective coefficient is judged to be an isolated coefficient.

7. The picture signal encoding method as claimed in claim 5, wherein the signal of the lowermost frequency band is encoded without being used as data constituting said coefficient tree.

8. The picture signal encoding method as claimed in claim 7, wherein if the input picture signal is an intra-picture, the signal of the lowermost frequency band is encoded by DPCM.

9. The picture signal encoding method as claimed in claim 3, wherein said step of variable-length coding run-length encodes said scan sequence for generating said encoded data.

10. A picture signal encoding method in which an input picture signal is split in frequency into subbands for hierarchically splitting the frequency spectrum of said input picture signal into a plurality of frequency bands, and in which the picture signal split in frequency is variable-length coded and transmitted, comprising the steps of:

motion-detecting the input picture signal using a prediction picture signal for generating motion vector information;

finding the difference between the input picture signal and the prediction picture signal for generating a prediction error signal;

splitting the prediction error signal into a high-frequency band signal and a low-frequency band signal;

downsampling the signals of the respective high and low frequency bands obtained by the third step of splitting the prediction error signal;

repeatedly splitting the spectrum of the downsampled signal of the low frequency band using pre-set low-pass and high-pass filters;

quantizing the signals of the respective frequency bands obtained by the steps of downsampling the signals and repeatedly splitting the spectrum of the downsampled signal for generating quantized coefficients of the plural frequency bands;

locally decoding the quantized coefficients of the plural frequency bands for re-constructing said prediction error signal;

motion compensation using the re-constructed prediction error signal and said motion vector information for generating said prediction error signal;

extracting from the quantized coefficients those coefficients at the same relative spatial positions of the respective frequency bands, the extracted coefficients constituting a coefficient tree;

S-scanning said coefficient tree in a direction proceeding from the low frequency band to the high frequency band for generating a scan sequence; and variable-length coding said scan sequence for generating encoded data.

11. The picture signal encoding method as claimed in claim 10, wherein it is judged in said step of variable-length coding whether the coefficient of said scan sequence is an insignificant coefficient or a significant coefficient and the number of consecutive insignificant coefficients in each frequency band is encoded in place of encoding the insignificant coefficients.

12. The picture signal encoding method as claimed in claim 11, wherein if an isolated coefficient occurs in said scan sequence which is of a value lower than a pre-set value, said isolated coefficient is deemed an insignificant coefficient.

13. The picture signal encoding method as claimed in claim 12, wherein if a respective coefficient in said scan coefficient is not a zero coefficient and all coefficients neighboring said respective coefficient are all insignificant coefficients, said respective coefficient is judged to be an isolated coefficient.

14. The picture signal encoding method as claimed in claim 13, wherein the signal of the lowermost frequency band of the signals of the frequency bands is encoded without being used as data constituting said coefficient tree.

15. The picture signal encoding method as claimed in claim 10, wherein said step of variable-length coding run-length encodes said scan sequence for generating said encoded data.

16. A picture signal decoding method for decoding encoded data that has been encoded by sub-band encoding an input picture signal for generating signals of plural frequency bands, quantizing the resulting signals of the respective frequency bands into quantized coefficients, extracting from the quantized coefficients those coefficients at the same relative spatial positions of respective frequency bands thereby generating a coefficient tree, S-scanning the resulting coefficient tree in a direction proceeding from the low frequency band towards the high frequency band for generating a scan sequence and variable-length coding the resulting scan sequence, said decoding method comprising the steps of:

variable-length decoding said encoded data for regenerating said scan sequence;

re-constructing said coefficient tree from said scan sequence;

locating the coefficients of the re-constructed coefficient tree at the same spatial positions of respective frequency bands;

dequantizing the coefficients located at the same spatial positions of the respective frequency bands for generating the signals of the plural frequency bands; and subband decoding the signals of the respective frequency bands for reproducing decoded picture signals.

17. The picture signal decoding method as claimed in claim 16, wherein said step of subband decoding the signals includes a sub-step of upsampling decoded signals of the respective frequency bands excluding signals of the uppermost frequency band and synthesizing the upsampled signals using a pre-set low-pass filter and a pre-set high-pass filter for generating signals of the low frequency band;

a sub-step of upsampling the signals of the uppermost frequency band for generating signals of the high frequency band; and a sub-step of synthesizing the signals of the low frequency band and the signals of the high frequency band using a pre-set low-pass filter and a pre-set high-pass filter for generating reproduced signals.

18. The picture signal decoding method as claimed in claim 16, wherein the number of consecutive insignificant coefficients in each frequency band is encoded in place of encoding the insignificant coefficients, and said step of subband decoding decodes said insignificant coefficients from said number of consecutive insignificant coefficients.

19. The picture signal decoding method as claimed in claim 16, wherein an isolated coefficient in said scan sequence of a value lower than a pre-set value is encoded as an insignificant coefficient, wherein said step of subband decoding decodes said insignificant coefficients.

20. The picture signal decoding method as claimed in claim 19, wherein if a respective coefficient in said scan sequence is not a zero coefficient and all coefficients neighboring said respective coefficient are all insignificant coefficients, said respective coefficient is deemed to be an isolated coefficient, wherein said step of subband decoding decodes said insignificant coefficients.

21. The picture signal decoding method as claimed in claim 16, wherein the lowermost frequency band of the signals of the plural frequency bands of the encoded data is encoded without being used as data constituting said coefficient tree, wherein said step of subband decoding decodes said signals of the lowermost frequency band.

22. The picture signal decoding method as claimed in claim 21, wherein if the input picture signal is an intra-picture, the signal of the lowermost frequency band is decoded by inverse DPCM.

23. The picture signal decoding method as claimed in claim 16, wherein said step of variable-length decoding run-length decodes said encoded data for regenerating said scan sequence.

24. A picture signal decoding method for decoding encoded data that has been encoded by sub-band encoding an input picture signal for generating signals of frequency bands, quantizing the resulting signals of the respective frequency bands into quantized coefficients, extracting from the quantized coefficients those coefficients at the same relative spatial positions of respective frequency bands thereby generating a coefficient tree, S-scanning the resulting coefficient tree in a direction proceeding from the low frequency band towards the high frequency band for generating a scan sequence and variable-length coding the resulting scan sequence, said decoding method comprising the steps of:

variable-length decoding said encoded data for regenerating said scan sequence;

re-constructing said coefficient tree from said scan sequence;

locating the coefficients of the re-constructed coefficient tree at the same spatial positions of respective frequency bands;

dequantizing the coefficients located at the same spatial positions of the respective frequency bands for generating the signals of the plural frequency bands;

subband decoding the signals of the respective frequency bands for reproducing decoded picture signals;

summing a prediction error signal and a prediction picture signal for generating a reproduced picture signal; and motion compensation using the reproduced picture signal and transmitted motion vector information for generating the prediction picture signal.

25. The picture signal decoding method as claimed in claim 24, wherein said step of variable-length decoding run-length decodes said encoded data for regenerating said scan sequence.

26. A picture signal encoding apparatus in which an input picture signal is split in frequency into subbands for hierarchically splitting the frequency spectrum of said input picture signal into a plurality of frequency bands, and in which the picture signal split in frequency is variable-length coded and transmitted, comprising:

first means for motion detecting the input picture signal using a prediction picture signal for generating motion vector information;

second means for finding the difference between the input picture signal and the prediction picture signal for generating a prediction error signal;

third means for splitting the prediction error signal into a high-frequency band signal and a low-frequency band signal;

fourth means for down-sampling the signals of the respective high and low frequency bands produced by said third means;

fifth means for repeatedly splitting the downsampled signals of the low frequency band using a pre-set low-pass filter and a high-pass filter for generating signals of plural frequency bands;

sixth means for quantizing the signals of the respective frequency bands produced by said fourth means and the fifth means for generating quantized signals of the respective frequency bands;

seventh means for locally decoding the quantized signals of plural frequency bands for reconstructing said predicted error signal;

eighth means for motion compensation using the re-constructed prediction error signal and said motion vector for generating said prediction error signal;

ninth means for extracting from the quantized coefficients those coefficients at the same relative spatial positions of the respective frequency bands, the extracted coefficients constituting a coefficient tree;

tenth means for S-scanning said coefficient tree in a direction proceeding from the low frequency band to the high frequency band for generating a scan sequence; and eleventh means for variable-length coding said scan sequence for generating encoded data.

27. The picture signal encoding apparatus as claimed in claim 26, wherein said eleventh means for variable-length coding run-length encodes said scan sequence for generating said encoded data.

28. The picture signal encoding apparatus as claimed in claim 26, wherein said eleventh means for variable-length coding said scan sequence judges whether the coefficient of said scan sequence is an insignificant coefficient or a significant coefficient and variable-length codes the number of consecutive insignificant coefficients in each frequency band in place of encoding the insignificant coefficients.

29. The picture signal encoding apparatus as claimed in claim 28, wherein if said eleventh means for variable-length coding recognizes an isolated coefficient in said scan sequence which is of a value lower than a pre-set value, said eleventh means for variable-length coding judges said isolated coefficient to be an insignificant coefficient.

30. The picture signal encoding apparatus as claimed in claim 29, wherein if said eleventh means for variable-length coding determines that a respective coefficient in said scan sequence is not a zero coefficient and all coefficients neighboring said respective coefficient are all insignificant coefficients, said eleventh means for variable-length coding judges said respective coefficient to be an isolated coefficient.

31. The picture signal encoding apparatus as claimed in claim 30, wherein said eleventh means for variable-length coding encodes the signals of the lowermost frequency band of said scan sequence without using said signals of the lowermost frequency band as data constituting said coefficient tree.

32. A picture signal decoding apparatus for decoding encoded data that has been encoded by sub-band encoding an input picture signal for generating signals of plural frequency bands, quantizing the resulting signals of the respective frequency bands into quantized coefficients, extracting from the quantized coefficients those coefficients at the same relative spatial positions of respective frequency bands thereby generating a coefficient tree, S-scanning the resulting coefficient tree in a direction proceeding from the low frequency band towards the high frequency band for generating a scan sequence, and variable-length coding the resulting scan sequence, said decoding apparatus comprising:

first means for variable-length decoding said encoded data for regenerating said scan sequence;

second means for re-constructing said coefficient tree from said scan sequence;

third means for locating the coefficients of the re-constructed coefficient tree at the same spatial positions of respective frequency bands;

fourth means for dequantizing the coefficients located at the same spatial positions of the layers for generating the signals of the plural frequency bands;

fifth means for subband decoding the signals of the respective frequency bands for reproducing decoded picture signals;

sixth means for summing a prediction error signal and a prediction picture signal for generating a reproduced picture signal; and seventh means for motion compensation using the reproduced picture signal and transmitted motion vector information for generating the prediction picture signal.

33. The picture signal decoding apparatus as claimed in claim 32, wherein said first means for variable-length decoding run-length encodes said encoded data for regenerating said scan sequence.

34. A picture signal encoding apparatus comprising:

means for subband splitting an input picture signal for hierarchically splitting the frequency spectrum of said input picture signal into a plurality of frequency bands;

means for quantizing the signals of the frequency bands for generating quantized coefficients of a plurality of frequency bands;

means for extracting from said quantized coefficients those coefficients at the same relative spatial positions of the respective frequency bands, the extracted coefficients constituting a coefficient tree;

means for S-scanning said coefficient tree in a direction proceeding from the low frequency band towards the high frequency band for generating a scan sequence; and means for variable-length coding said scan sequence for generating encoded data.

35. A picture signal encoding apparatus in which an input picture signal is split in frequency into subbands for hierarchically splitting the frequency spectrum of said input picture signal into a plurality of frequency bands, and in which the picture signal split in frequency is variable-length coded and transmitted, comprising:

means for splitting the input picture signal into a high-frequency band signal and a low-frequency band signal, using a first stage low-pass filter and a high-pass filter;

means for downsampling signals of the respective frequency bands obtained by said means for splitting the input picture signal;

means for repeatedly frequency-splitting the down-sampled signals of the low frequency band using a pre-set low-pass filter and a high-pass filter for generating signals of the respective frequency bands;

means for quantizing the signals of the frequency bands obtained from the means for downsampling signals and means for repeatedly frequency-splitting the down-sampled signals for generating quantized coefficients of plural frequency bands;

means for extracting from said quantized coefficients those coefficients in the same relative spatial positions of the respective frequency bands, the extracted coefficients constituting a coefficient tree;

means for S-scanning said coefficient tree in a direction proceeding from the low frequency band to the high frequency band for generating a scan sequence; and means for variable-length coding said scan sequence for generating encoded data.

36. The picture signal encoding apparatus as claimed in claim 35, wherein said means for variable-length coding said scan sequence judges whether the coefficient of said scan sequence is an insignificant coefficient or a significant coefficient and variable-length codes the number of consecutive insignificant coefficients in each frequency band in place of the insignificant coefficients.

37. The picture signal encoding apparatus as claimed in claim 36, wherein if said means for variable-length coding recognizes an isolated coefficient in said scan sequence which is of a value lower than a pre-set value, said means for variable-length coding judges said isolated coefficient to be an insignificant coefficient.

38. The picture signal encoding apparatus as claimed in claim 37, wherein if said means for variable-length coding determines that a respective coefficient in said scan sequence is not a zero coefficient and all coefficients neighboring said respective coefficient are all insignificant coefficients, said means for variable-length coding judges said respective coefficient to be an isolated coefficient.

39. The picture signal encoding apparatus as claimed in claim 37, wherein said means for variable-length coding encodes signals of the lowermost frequency band of said scan sequence without using said signals of the lowermost frequency band as data constituting said coefficient tree.

40. The picture signal encoding apparatus as claimed in claim 39, wherein said means for variable-length coding encodes the lowermost frequency band of an intra-picture signal using DPCM.

41. A picture signal decoding apparatus for decoding encoded data that has been encoded by sub-band encoding an input picture signal for generating signals of plural frequency bands, quantizing the resulting signals of the respective frequency bands into quantized coefficients, extracting from the quantized coefficients those coefficients at the same relative spatial positions of respective frequency bands thereby generating a coefficient tree, S-scanning the resulting coefficient tree in a direction proceeding from the low frequency band towards the high frequency band for generating a scan sequence and variable-length coding the resulting scan sequence, said decoding apparatus comprising:

means for variable-length decoding said encoded data for regenerating said scan sequence;
  means for re-constructing said coefficient tree from said scan sequence;
  means for locating the coefficients of the re-constructed coefficient tree at the same spatial positions of respective frequency bands;
  means for dequantizing the coefficients located at the same spatial positions of the respective frequency bands for generating the signals of the plural frequency bands; and
  means for subband decoding the signals of the respective frequency bands for reproducing decoded picture signals.

42. The picture signal decoding apparatus as claimed in claim 41, wherein said means for subband decoding the signals upsamples decoded signals of the respective frequency bands excluding signals of the uppermost frequency band and synthesizes the upsampled signals using a pre-set low-pass filter and a pre-set high-pass filter for generating signals of the low frequency band, upsamples the signals of the uppermost frequency band for generating signals of the high frequency band, and synthesizes the signals of the low frequency band and the signals of the high frequency band using a pre-set low-pass filter and a pre-set high-pass filter for generating reproduced signals.

43. The picture signal decoding apparatus as claimed in claim 41, wherein the number of consecutive insignificant coefficients in each frequency band is encoded in place of encoding the insignificant coefficients, wherein said means for subband decoding decodes said insignificant coefficients from said number of consecutive insignificant coefficients.

44. The picture signal decoding apparatus as claimed in claim 41, wherein an isolated coefficient in said scan sequence of a value lower than a pre-set value is encoded as an insignificant coefficient, wherein said means for subband decoding decodes said insignificant coefficients.

45. The picture signal decoding apparatus as claimed in claim 44, wherein if a respective coefficient in said scan sequence is not a zero coefficient and all coefficients neighboring said respective coefficient are all insignificant coefficients, said respective coefficient is deemed to be an isolated coefficient, wherein said means for subband decoding decodes said insignificant coefficients.

46. The picture signal decoding apparatus as claimed in claim 41, wherein the lowermost frequency band of the signals of the plural frequency bands of the encoded data is encoded without being used as data constituting said coefficient tree, wherein said means for subband decoding decodes said signals of the lowermost frequency band.

47. The picture signal decoding apparatus as claimed in claim 46, wherein if the input picture signal is an intra-picture, wherein said means for subband decoding decodes the signal of the lowermost frequency band is decoded by inverse DPCM.

* * * * *